(12) United States Patent
Jung et al.

(10) Patent No.: US 9,746,602 B2
(45) Date of Patent: Aug. 29, 2017

(54) BACKLIGHT DEVICE AND DISPLAY DEVICE INCLUDING THE SAME

(71) Applicant: SAMSUNG DISPLAY CO., LTD., Yongin-si, Gyeonggi-do (KR)

(72) Inventors: Mi-Young Jung, Chungcheongnam-do (KR); Jae Sang Lee, Chungcheongnam-do (KR); Kyu-Tae Park, Ulsan (KR); Yong Hun Jung, Seoul (KR); Sung Yeon Hwang, Uijeongtbu-si (KR); Min Woo Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 13/899,354

(22) Filed: May 21, 2013

(65) Prior Publication Data

US 2014/0043848 A1 Feb. 13, 2014

(30) Foreign Application Priority Data

Aug. 10, 2012 (KR) .................. 10-2012-0087862

(51) Int. Cl.
*F21V 7/04* (2006.01)
*F21V 8/00* (2006.01)
*G02F 1/1335* (2006.01)

(52) U.S. Cl.
CPC ......... *G02B 6/0088* (2013.01); *G02B 6/0055* (2013.01); *G02F 1/133615* (2013.01); *G02F 2201/46* (2013.01); *G02F 2201/465* (2013.01)

(58) Field of Classification Search
CPC .............. G02B 6/0088; G02B 6/0055; G02F 1/133615; G02F 2201/46; G02F 2201/465

USPC .................................. 362/606, 433, 634
See application file for complete search history.

(56) References Cited

U.S. PATENT DOCUMENTS

| 5,815,227 A | 9/1998 | Lee |
| 7,896,536 B2* | 3/2011 | Arita et al. .................. 362/633 |
| 2008/0048958 A1* | 2/2008 | Kim et al. ..................... 345/87 |
| 2009/0091688 A1* | 4/2009 | Tanaka et al. .................. 349/65 |
| 2009/0180049 A1* | 7/2009 | Lee et al. ....................... 349/58 |

(Continued)

FOREIGN PATENT DOCUMENTS

| CN | 101198228 | 6/2008 |
| CN | 101435932 | 5/2009 |

(Continued)

OTHER PUBLICATIONS

European Search Report dated Sep. 24, 2013.

*Primary Examiner* — Evan Dzierzynski
(74) *Attorney, Agent, or Firm* — F. Chau & Associates, LLC

(57) ABSTRACT

A backlight device according to an exemplary embodiment of the present invention includes, a light guide plate including a convex portion and a recess portion, a lower cover including a lateral surface cover part positioned adjacent to the convex portion, the lower cover surrounding the light guide plate, and a fixing member positioned between the light guide plate and the lateral surface cover part of the lower cover, in which the lateral cover part includes an opening, and the fixing member includes a first hook surrounding the convex portion and a second hook protruding through the opening of the lateral surface cover part.

29 Claims, 13 Drawing Sheets

(56) References Cited

U.S. PATENT DOCUMENTS

| | | | |
|---|---|---|---|
| 2010/0149836 A1* | 6/2010 | Hung et al. | 362/634 |
| 2010/0177124 A1* | 7/2010 | Ryu et al. | 345/690 |
| 2010/0289979 A1* | 11/2010 | Lee | 349/58 |
| 2011/0126440 A1* | 6/2011 | Lee et al. | 40/700 |
| 2012/0044714 A1 | 2/2012 | Lee et al. | |
| 2013/0044417 A1* | 2/2013 | Kim | 361/679.01 |

FOREIGN PATENT DOCUMENTS

| | | |
|---|---|---|
| CN | 102081883 | 6/2011 |
| EP | 1892560 | 2/2008 |
| EP | 2 045 653 A1 | 10/2008 |
| EP | 2 544 046 A2 | 1/2013 |
| JP | 2003107467 | 4/2003 |
| JP | 2007178463 | 7/2007 |
| JP | 2009-069713 | 4/2009 |
| KR | 200353769 | 6/2004 |
| KR | 1020040097467 | 11/2004 |
| KR | 1020070000855 | 1/2007 |
| KR | 1020080056365 | 6/2008 |
| KR | 100905333 | 6/2009 |
| KR | 1020100082623 | 7/2010 |
| KR | 1020110066789 | 6/2011 |
| KR | 1020110097274 | 8/2011 |
| KR | 1020120025900 | 3/2012 |

\* cited by examiner

BACKLIGHT DEVICE AND DISPLAY DEVICE INCLUDING THE SAME

CROSS-REFERENCE TO RELATED APPLICATION

This application claims priority to Korean Patent Application No. 10-2012-0087862 filed in the Korean Intellectual Property Office on Aug. 10, 2012, the entire contents of which are herein incorporated by reference.

TECHNICAL FIELD

Embodiments of the present invention relate to a backlight device and a display device including the backlight device.

DISCUSSION OF THE RELATED ART

Liquid crystal displays (LCDs) include a backlight device. Backlight devices may be classified into a direct type and an edge type according to the type of light irradiation. In the edge type backlight, a light source is positioned at a side of a light guide plate.

To fix the light guide plate in the bottom chassis, a holder may be used. However, such a holder-type fixing member is not easy to apply to narrow-bezel LCDs.

SUMMARY

Embodiments of the present invention provide a backlight device including a fixing member having a double hook structure and a display device including the backlight device.

An exemplary embodiment of the present invention provides a backlight device including a light guide plate including a convex portion and a recess portion, a lower cover including a lateral surface cover part positioned adjacent to the convex portion, the lower cover receiving the light guide plate, and a fixing member positioned between the light guide plate and the lateral surface cover part of the lower cover, in which the lateral surface cover part includes an opening, and the fixing member includes a first hook surrounding the convex portion and a second hook protruding through the opening of the lateral surface cover part.

The first hook may be latched to an upper surface of the convex portion.

The first hook may cover two lateral surfaces of the convex portion and a part connected from each of the two lateral surfaces to the upper surface of the convex portion.

The light guide plate may have a horizontal cross-section shaped substantially like a polygon including a plurality of sides, and the fixing member may be positioned at a first side of the horizontal cross-section of the light guide plate.

The backlight device may include a light source unit positioned at a second side of the horizontal cross-section of the light guide plate, wherein the second side is different from the first side.

The first side may be longer than the second side.

The backlight device may include a reflective sheet positioned at a lower part of the light guide plate, in which the reflective sheet may include a convex portion and a recess portion respectively corresponding to the convex portion and the recess portion of the light guide plate.

A plurality of fixing members may be disposed along one side of the light guide plate.

The convex portion may include a first convex portion and a second convex portion with the recess portion disposed between the first and second convex portions, the first hook may cover one lateral surface of the first convex portion and a part connected from the one lateral surface of the first convex portion to an upper surface of the first convex portion, and one lateral surface of the second convex portion and a part connected from the one lateral surface of the second convex portion to an upper surface of the second convex portion, and the one lateral surface of the first convex portion and the one lateral surface of the second convex portion may face each other with respect to the recess portion.

The light guide plate may have a horizontal cross-section shaped substantially like a polygon including a plurality of sides, and the fixing member may be positioned at a first side of the horizontal cross-section of the light guide plate.

The backlight device may include a light source unit positioned at a second side of the horizontal cross-section of the light guide plate, wherein the second side is different from the first side.

The first side may be longer than the second side.

The backlight device may further include a reflective sheet positioned at a lower part of the light guide plate, in which the reflective sheet may include a convex portion and a recess portion respectively corresponding to the convex portion and the recess portion of the light guide plate.

A plurality of fixing members may be formed along one side of the light guide plate.

The fixing member may be a light blocking member.

An exemplary embodiment of the present invention provides a display device including a display panel and a backlight device configured to supply light to the display panel, in which the backlight device includes a light guide plate including a convex portion and a recess portion, a lower cover including a lateral surface cover part positioned adjacent to the convex portion, the lower cover surrounding the light guide plate, and a fixing member positioned between the light guide plate and the lateral surface cover part of the lower cover, and the lateral surface cover part includes an opening, and the fixing member includes a first hook surrounding the convex portion and a second hook protruding through the opening of the lateral surface cover part.

The first hook may cover two lateral surfaces of the convex portion and a part connected from each of the both lateral surfaces to the upper surface of the convex portion.

The light guide plate may have a horizontal cross-section shaped substantially like a polygon including a plurality of sides, and the fixing member may be positioned at a first side of the horizontal cross-section of the light guide plate.

The display device may include a light source part positioned at a second side of the horizontal cross-section of the light guide plate, wherein the second side is different from the first side.

The first side may be longer than the second side.

The display device may further include a reflective sheet positioned in a lower part of the light guide plate, in which the reflective sheet may include a convex portion and a recess portion respectively corresponding to the convex portion and the recess portion of the light guide plate.

A plurality of fixing members may be formed along one side of the light guide plate.

The convex portion may include a first convex portion and a second convex portion with the recess portion disposed between the first and second convex portions, the first hook may cover one lateral surface of the first convex portion and a part connected from the one lateral surface of the first convex portion to an upper surface of the first convex portion, and one lateral surface of the second convex portion and a part connected from the one lateral surface of the second convex portion to an upper surface of the second convex portion, and the one lateral surface of the first convex portion and the one lateral surface of the second convex portion may face each other with respect to the recess portion.

The light guide plate may have a horizontal cross-section shaped substantially like a polygon including a plurality of sides, and the fixing member may be positioned at a first side of the horizontal cross-section of the light guide plate.

The display device may include a light source part positioned at a second side of the horizontal cross-section of the light guide plate, wherein the second side is different from the first side.

The first side may be longer than the second side.

The display device may include a reflective sheet positioned in a lower part of the light guide plate, in which the reflective sheet may include a convex portion and a recess portion respectively corresponding to the convex portion and the recess portion of the light guide plate.

A plurality of fixing members may be formed along one side of the light guide plate.

The fixing member may be a light blocking member.

According to an embodiment, there is provided a fixing member comprising a first hook sized and dimensioned to hold a protrusion of a light guide plate of a display, wherein the first hook is positioned on an upper surface of a part of a side wall of a cover of the display and a second hook sized and dimensioned to protrude through an opening of the side wall of the cover of the display.

According to an exemplary embodiment of the present invention, a light guide plate may be fixed in a narrow-bezel display without a separate tape or screw by using a fixing member having a double-hook structure having a first hook and a second hook. Light leakage generated through a lateral surface may be prevented by forming the fixing member as a light blocking member.

DETAILED DESCRIPTION OF THE EMBODIMENTS

Figure 1:
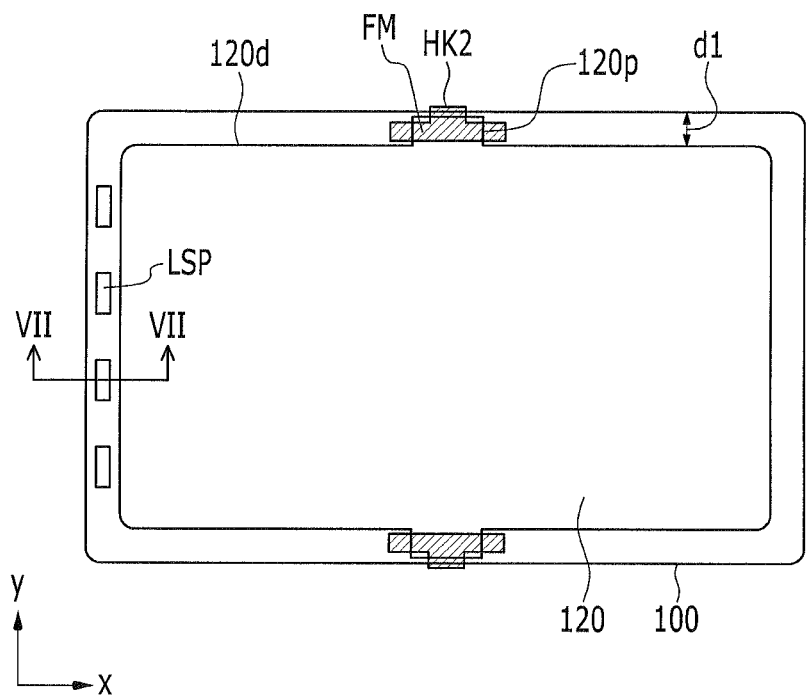
FIG. 1 is a top plan view illustrating a backlight device according to an exemplary embodiment of the present invention.

Hereinafter, exemplary embodiments of the present invention will be described in detail with reference to the accompanying drawings.

In the drawings, the thickness of layers, films, panels, regions, etc., may be exaggerated for clarity. It will be understood that when a layer is referred to as being "on" another layer or substrate, it can be directly on the other layer or substrate, or intervening them may also be present. As used herein, the singular forms, "a," "an" and "the" are intended to include the plural forms as well, unless the context clearly indicates otherwise. Like reference numerals may designate like or similar elements throughout the specification and the drawings.

FIG. 1 is a top plan view illustrating a backlight device according to an exemplary embodiment of the present invention.

Referring to FIG. 1, a light guide plate 120 of the backlight device according to an exemplary embodiment of the present invention is substantially shaped like a rectangle, and two convex portions 120*p*, respectively, are formed at two sides of the light guide plate 120. According to an embodiment, at least one convex portion may be formed at, at least, one side of the light guide plate 120. A convex portion 120*p* may be formed at substantially a central part of one side of the light guide plate 120. In an exemplary embodiment, the remaining sides of the light guide plate 120, except for the sides where the convex portions 120*p* are formed, may be defined as recess portions 120*d*.

In an exemplary embodiment, fixing members FM, respectively, are formed corresponding to the convex portions 120*p* of the light guide plate 120. The fixing member FM includes a first hook HK1 and a second hook HK2. The second hook HK2 protrudes in a Y-axis direction.

According to an embodiment, when a side where the convex portion 120*p* of the light guide plate 120 is formed is referred to as a first side, and a side where no convex portion 120*p* is formed is referred to as a second side, a plurality of light source units LSP may be formed adjacent to the second side. According to an embodiment, the first side is longer than the second side, and thus the light source unit LSP is formed at a relatively shorter side, and the fixing member FM is formed at a relatively longer side.

Hereinafter, a backlight device according to an exemplary embodiment of the present invention is described with reference to FIGS. 2 to 6.

Figure 2:
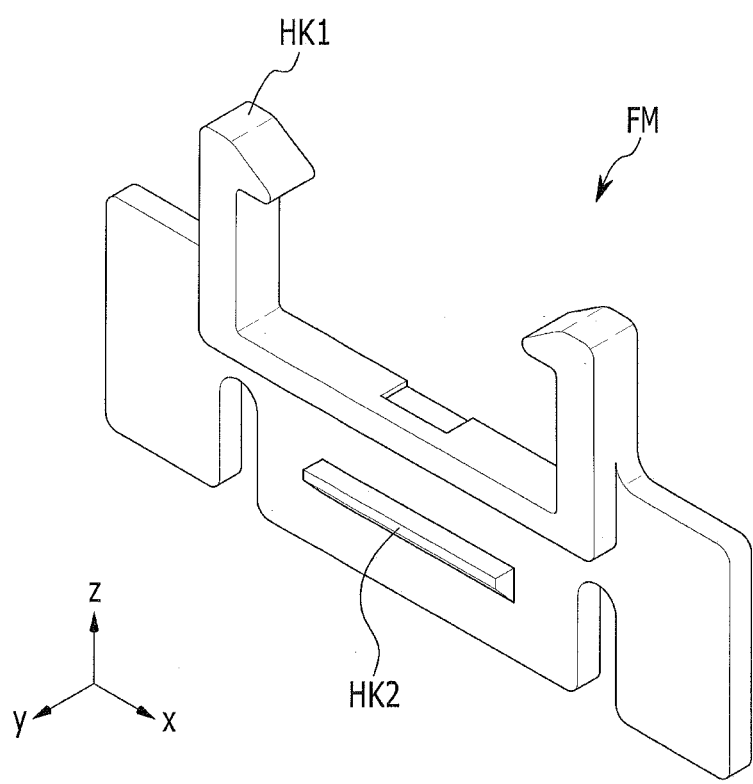
FIG. 2 is a perspective view illustrating the fixing member of FIG. 1 according to an exemplary embodiment.

FIG. 2 is a perspective view illustrating the fixing member of FIG. 1 according to an exemplary embodiment.

Referring to FIG. 2, the fixing member FM in an exemplary embodiment includes the first hook HK1 formed substantially in parallel to an XZ-plane and shaped like a hook and the second hook HK2 protruding in the Y-axis direction. According to an embodiment, the fixing member FM may include at least one of polycarbonate (PC), acrylonitrile butadiene styrene (ABS), polyethylene terephthalate (PET), and glass fiber (G/F). According to an embodiment, the fixing member FM may be formed of a material capable of blocking light. For example, the fixing member FM may be a light blocking member. When a protruding shape, such as the convex portion, is formed at an edge side of the light guide plate, light may be reflected or transmitted at a protruding portion, so that an uniformity of brightness may be decreased. However, according to an embodiment, when the fixing member is formed of a light-blocking material, light reflection or light transmission may be decreased.

Figure 3:
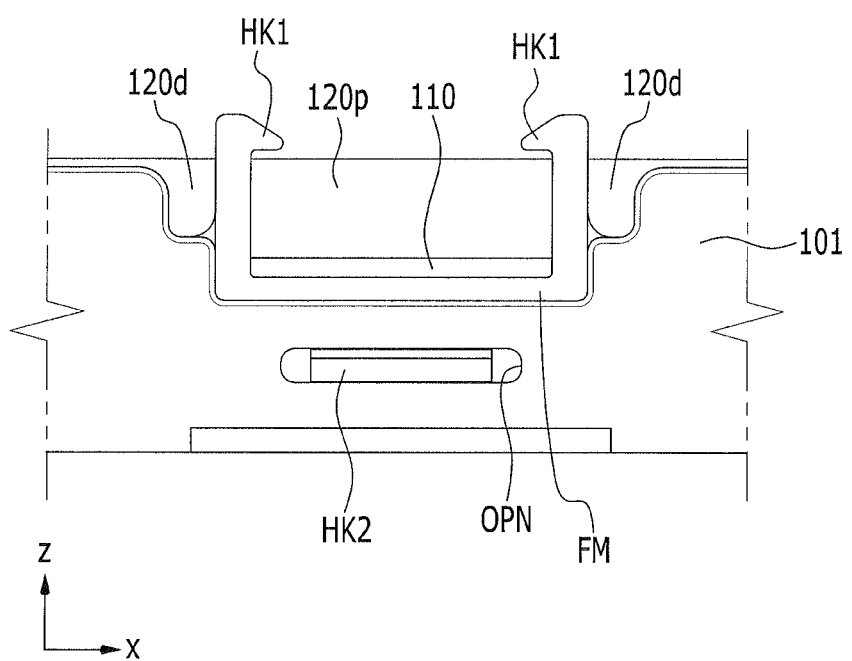
FIG. 3 is a front view illustrating the backlight device of FIG. 1 as viewed in a Y-axis direction according to an exemplary embodiment.
Figure 4:
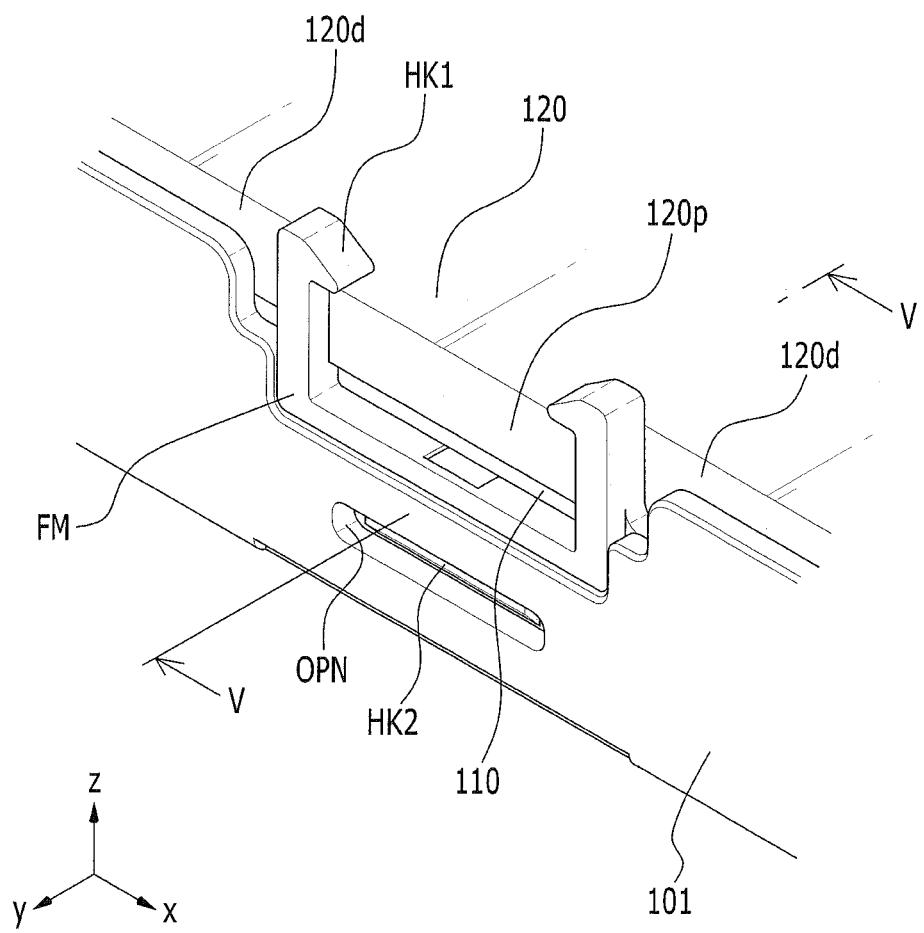
FIG. 4 is a perspective view illustrating the backlight device of FIG. 1 according to an exemplary embodiment.
Figure 5:
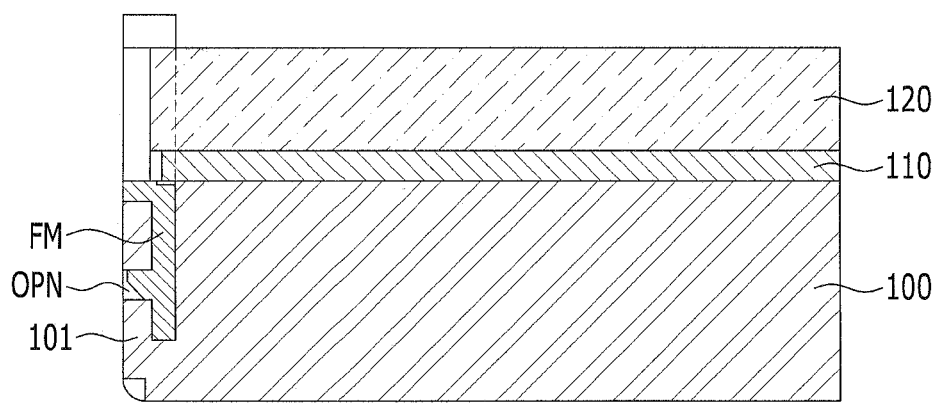
FIG. 5 is a cross-sectional view taken along line V-V of FIG. 4.
Figure 6:
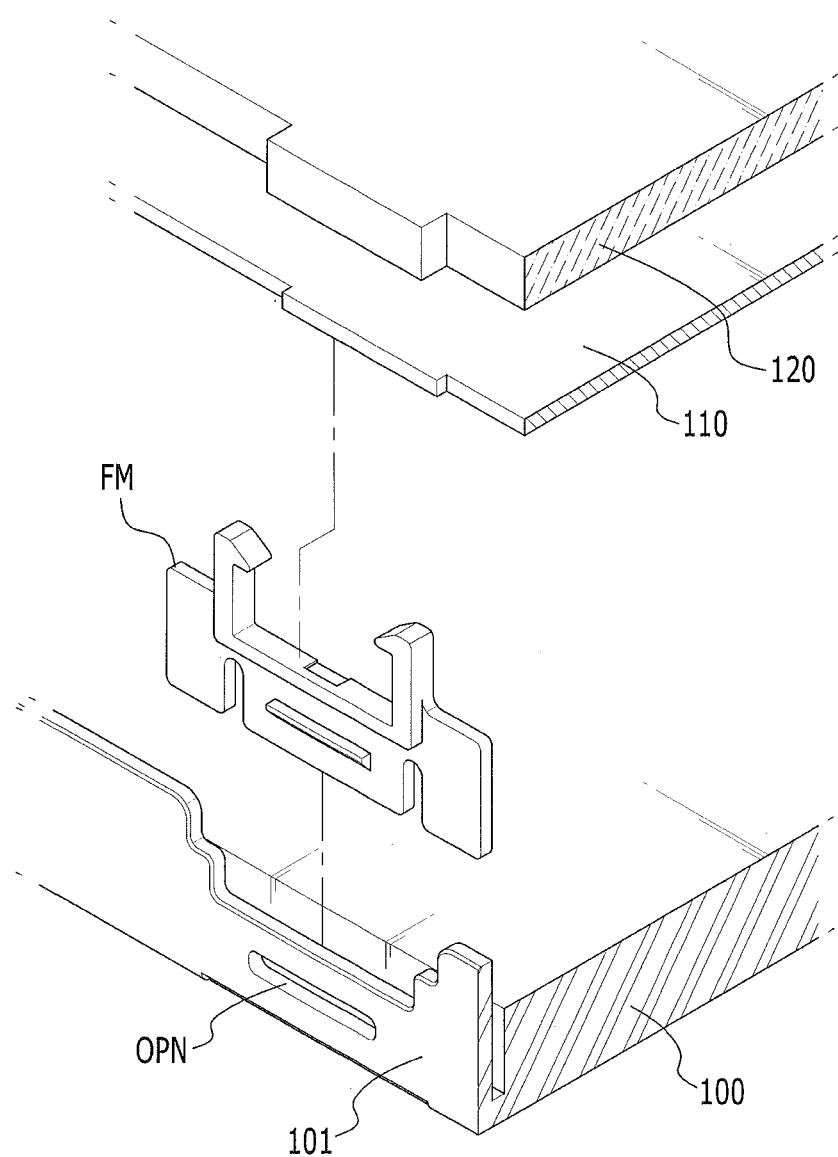
FIG. 6 is a exploded perspective view illustrating the backlight device of FIG. 4.

FIG. 3 is a front view illustrating the backlight device of FIG. 1 when viewed in the Y-axis direction according to an exemplary embodiment. FIG. 4 is a perspective view illustrating the backlight device of FIG. 1 according to an exemplary embodiment. FIG. 5 is a cross-sectional view taken along line V-V of FIG. 4. FIG. 6 is a exploded perspective view illustrating the backlight device of FIG. 4.

Referring to FIGS. 3 to 6, the backlight device according to an exemplary embodiment includes a lateral surface cover part 101 of a lower cover surrounding a side surface of the light guide plate 120. The lower cover will be later described in detail with reference to FIG. 7. The lateral surface cover part 101 of the lower cover is positioned at a part corresponding to the convex portion 120p in the direction (Y-axis direction) in which the convex portion 120p of the light guide plate 120 protrudes. The fixing member FM is disposed between the light guide plate 120 and the lateral surface cover part 101 of the lower cover.

The first hook HK1 of the fixing member FM covers two side surfaces of the convex portion 120p and parts connected from the two side surfaces to an upper surface of the convex portion 120p. As illustrated in FIGS. 3 and 4, the first hook HK1 is latched to the upper surface of the light guide plate 120. Accordingly, in an exemplary embodiment, the first hook HK1 may prevent the light guide plate 120 from moving in the X-axis direction and the Z-axis direction.

The fixing member FM may be in close contact with the recess portion 120d and the lateral surface cover part 101 between the recess portion 120d of the light guide plate 120 and the lateral surface cover part 101.

The lateral surface cover part 101 is provided with an opening OPN, and the second hook HK2 of the fixing member FM protrudes into the opening OPN. In an exemplary embodiment, the second hook HK2 may prevent the light guide plate 120 from moving in the Y-axis direction and the Z-axis direction.

In an exemplary embodiment, a reflective sheet 110 positioned at a lower end of the light guide plate 120 may also have a convex portion and a recess portion formed at an edge side thereof according to the convex and recessed shapes of the light guide plate 120. According to an embodiment, the reflective sheet 110 is fixed together with the light guide plate 120 by the fixing member FM and is prevented from moving.

The fixing member FM according to an exemplary embodiment may prevent the light guide plate 120 and the lower cover 100 from moving and being separated in the X, Y, or Z-axis direction.

Figure 7:
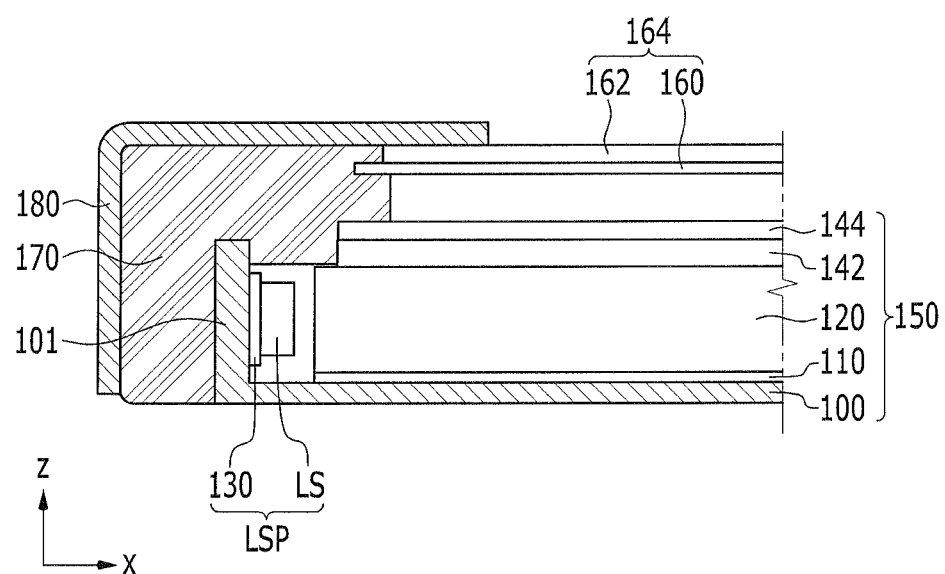
FIG. 7 is a cross-sectional view illustrating a display device including the backlight device of FIG. 1.

FIG. 7 is a cross-sectional view illustrating a liquid crystal display device including the backlight device of FIG. 1. FIG. 7 is a cross-sectional view taken along line VII-VII of FIG. 1.

Referring to FIG. 7, the display device according to an exemplary embodiment of the present invention may include a display panel 164 configured to display an image, a backlight device 150 configured to provide light to the display panel 164, and an upper cover 180 and a lower cover 100 configured to receive the display panel 164 and the backlight device 150.

The upper cover 180 is bent and surrounds a non-display area of the display panel 164 and a side surface of the lower cover 110. A mold frame 170 may be formed between the upper cover 180 and the lower cover 110 and supports, e.g., the elements 164 and 150.

The display panel 164 displays an image by adjusting light transmittance from the backlight device 150 according to an image signal, and the display device according to the present exemplary embodiment may be a liquid crystal display device. According to an embodiment, when the display device according to an exemplary embodiment is a liquid crystal display device, the display panel 164 may include a liquid crystal layer formed between a lower substrate 160 and an upper substrate 162, and a spacer configured to maintain a predetermined space between the lower substrate 160 and the upper substrate 162.

According to an embodiment, the upper substrate 162 includes color filters, black matrixes, and a common electrode.

The lower substrate 160 may include thin film transistors and pixel electrodes connected to the thin film transistors, respectively. According to an embodiment, the common electrode may be formed on the lower substrate 160 according to a liquid crystal mode, and the color filters or the black matrixes may be formed on the lower substrate 160, e.g., for increasing an aperture ratio.

The backlight device 150 includes the light guide plate 120 configured to convert light radiated from the light source LS into surface light and supply the surface light to the display panel 164, a diffuser sheet 142 positioned on the light guide plate 120 and configured to emit uniform light by scattering the light emitted from the light guide plate 120, a prism sheet 144 positioned on the diffuser sheet 142 and configured to collect light diffused by the diffuser sheet 142, and the reflective sheet 110 positioned in a lower part of the light guide plate 120 and configured to reflect light leaking from an opposite side of the display panel 164 to the light guide plate 120.

In an exemplary embodiment, the light source LS is mounted on a printed circuit board (PCB) 130. The light source (LS) may receive power and an electric signal through the printed circuit board (PCB) 130 from an external source. Referring to FIGS. 1 and 7, the light source unit LSP including the light source LS and the printed circuit board (PCB) 130 is disposed along one edge side of the light guide plate 120 and adjacent to the one edge side of the light guide plate 120. According to an embodiment, the light source LS may use a light emitting diode (LED). As shown in FIG. 7, the light source unit LSP has a structure of a top view type, but alternatively, the light source unit LSP may have a side view-type structure.

The lower cover 100 includes the lateral surface cover part 101 having an edge with an L shape. According to an embodiment, the lower cover 100 may include the lateral surface cover part having a shaped substantially like a letter "C" by transforming the structure of the lateral surface cover part 101, and the transformed lateral surface cover part may prevent light leakage by covering the remaining surfaces, except for a surface facing the light guide plate 120 of the light source LS.

Figure 8:
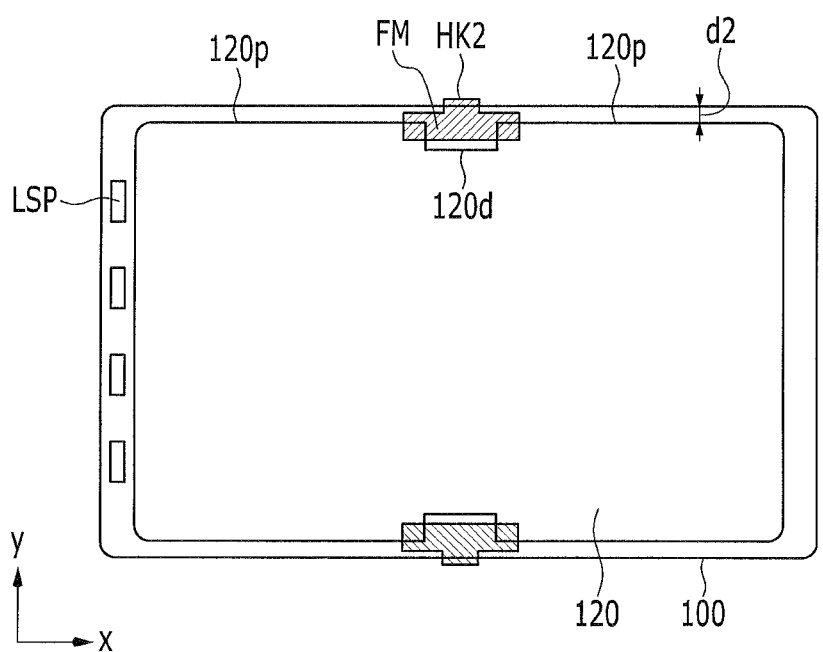
FIG. 8 is a top plan view illustrating a backlight device according to an exemplary embodiment of the present invention.

FIG. 8 is a top plan view illustrating a backlight device according to an exemplary embodiment of the present invention.

A light guide plate 120 of the backlight device according to an exemplary embodiment has substantially the same rectangular shape as the light guide plate 120 described with reference to FIG. 1, but has recess portions 120d formed at two of the four sides of the light guide plate 120. The recess portion 120d may be formed at a central part of one side of the light guide plate 120. In an exemplary embodiment, a recess portion 120d is formed at each of two facing sides of the light guide plate 120, and the remaining sides of the light guide plate 120, except for the recess portions, are defined as a convex portion 120p. In another embodiment, recess portion 120d may be formed at one or three of four sides of the light guide plate 120.

In an exemplary embodiment, a fixing member FM is formed corresponding to the recess portion 120d of the light guide plate 120. The fixing member FM includes a first hook HK1 and a second hook HK2 protruding in the Y-axis direction.

When a side where the recess portion 120d of the light guide plate 120 is formed is referred to as a first side, and another side where no recess portion 120d is formed is referred to as a second side, a plurality of light source units LSP may be formed adjacent to the second side. The first side is longer than the second side, and thus the light source unit LSP is formed at the relatively shorter side and the fixing member FM is formed at the relatively longer side.

Hereinafter, a backlight device according to an exemplary embodiment of the present invention is described in detail with reference to FIGS. 9 to 11.

Figure 9:
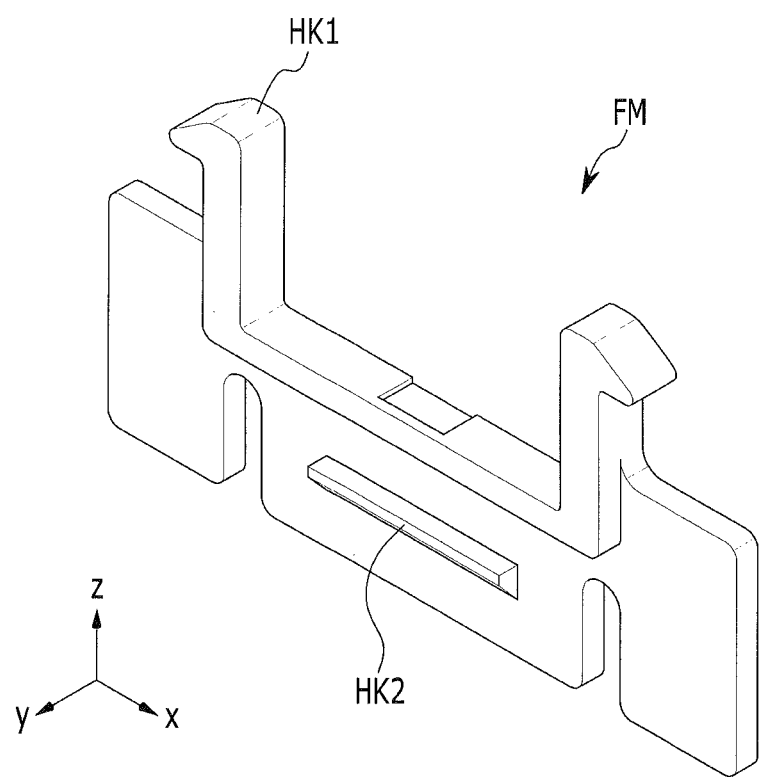
FIG. 9 is a perspective view illustrating a fixing member of FIG. 8 according to an exemplary embodiment.

FIG. 9 is a perspective view illustrating the fixing member of FIG. 8 according to the exemplary embodiment.

Referring to FIG. 9, the fixing member FM according to an exemplary embodiment includes the first hook HK1 formed substantially in parallel to an XZ-plane and shaped like a hook and the second hook HK2 protruding in the Y-axis direction. According to an embodiment, the fixing member FM may include at least one of polycarbonate (PC), acrylonitrile butadiene styrene (ABS), polyethylene terephthalate (PET), and glass fiber (G/F). According to an embodiment, the fixing member FM may be formed of a material capable of blocking light. The fixing member FM may be a light blocking member.

When a protruding portion, such as the convex portion, is formed at an edge side of the light guide plate, light may be reflected or transmitted at the protruding portion, and brightness may be decreased. However, according to an embodiment, when the fixing member is formed of a material capable of blocking light, light reflection or light transmission may be decreased.

Figure 10:
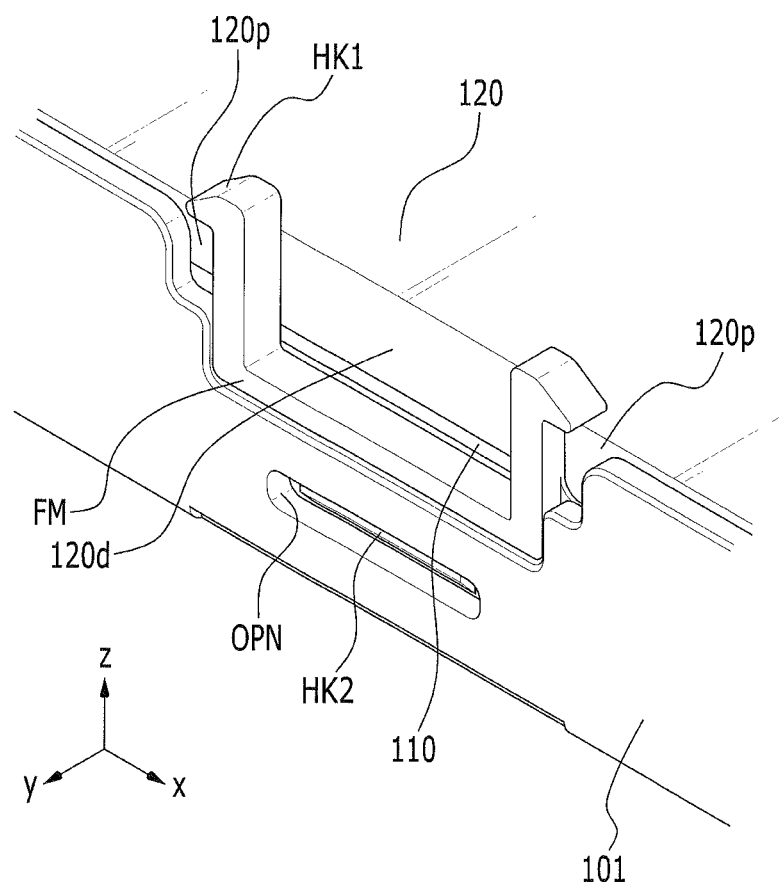
FIG. 10 is a perspective view illustrating the backlight device of FIG. 8 according to an exemplary embodiment.

FIG. 10 is a perspective view illustrating the backlight device of FIG. 8 according to an exemplary embodiment.

Referring to FIG. 10, the backlight device according to an exemplary embodiment includes a lateral surface cover part 101 of a lower cover surrounding a side surface of the light guide plate 120. The lateral surface cover part 101 of the lower cover is positioned at a part corresponding to the recess portion 120d in the direction (Y-axis direction) in which the recess portion 120d of the light guide plate 120 is depressed. The fixing member FM is disposed between the light guide plate 120 and the lateral surface cover part 101 of the lower cover.

The first hook HK1 of the fixing member FM covers a part connected from one side surface of one convex portion 120p between the adjacent convex portions 120p to an upper surface of the one convex portion 120p and a part connected from one side surface of another convex portion 120p to the upper surface of the other convex portion 120p. According to an embodiment, the side surfaces of the adjacent convex portions 120p face each other with respect to the recess portion 120d.

Accordingly, in an exemplary embodiment, the first hook HK1 may prevent the light guide plate 120 from moving in the X-axis direction and the Z-axis direction.

The fixing member FM may be in close contact with the convex portion 120p and the lateral surface cover part 101 between the convex portion 120p of the light guide plate 120 and the lateral surface cover part 101.

The lateral surface cover part 101 is provided with an opening OPN, and the second hook HK2 of the fixing member FM protrudes into the opening OPN. In an exemplary embodiment, the second hook HK2 may prevent the light guide plate 120 from moving in the Y-axis direction and the Z-axis direction.

Figure 11:
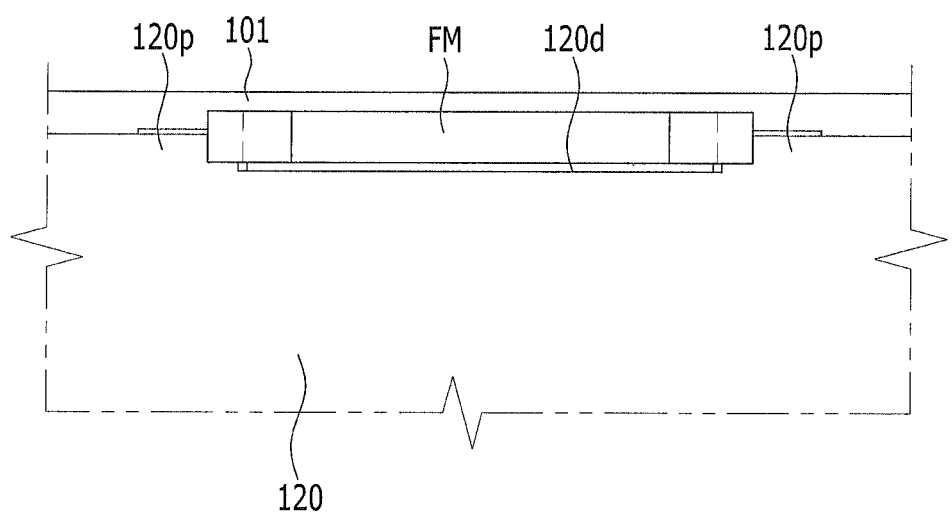
FIG. 11 is a top plan view illustrating an edge portion of the backlight device of FIG. 8 according to an exemplary embodiment.

FIG. 11 is a top plan view illustrating an edge portion of the backlight device of FIG. 8 according to the exemplary embodiment.

Referring to FIG. 11, since an outermost edge of the light guide plate of FIG. 1 according to an exemplary embodiment may be disposed to an outer side of a constituent module by disposing the fixing member FM at the recess portion 120d of the light guide plate 120, a bezel size may be further reduced. Referring back to FIGS. 1 and 8, a first distance d1 between an outmost edge of the light guide plate 120 and an outmost edge of the lower cover 100 as shown in FIG. 1 is longer than a second distance d2 between an outermost edge of the light guide plate 120 and an outermost edge of the lower cover 100 as shown in FIG. 8.

Figure 12:
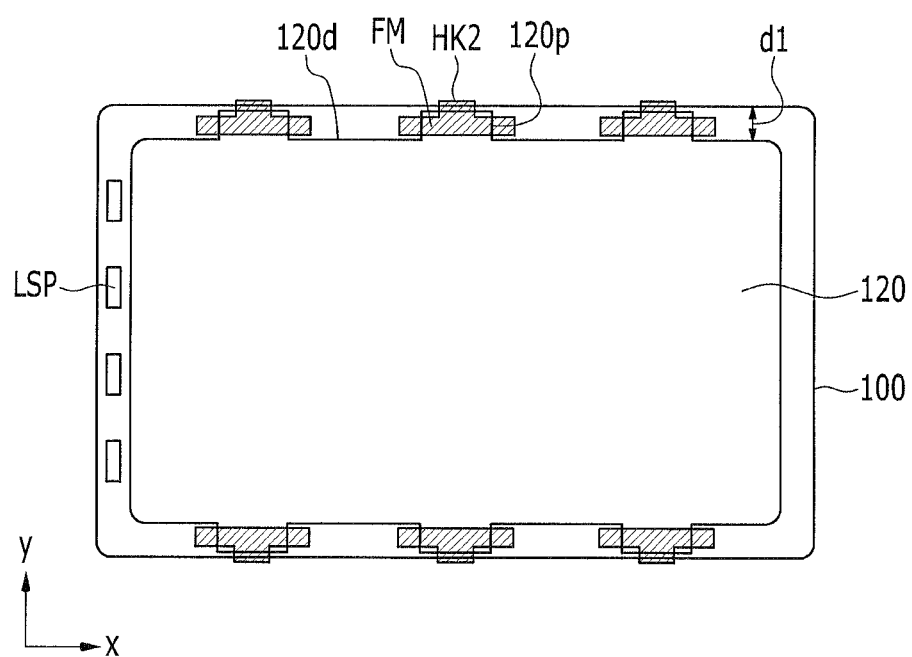
FIG. 12 is a top plan view illustrating a backlight device according to an embodiment of the present invention.

FIG. 12 is a top plan view illustrating a backlight device according to an embodiment of the present invention.

Referring to FIG. 12, the backlight device is the same or substantially the same as the backlight device described with reference to FIG. 1, except that a plurality of convex portions 120p are formed at one or more of four sides of the light guide plate 120, and a plurality of fixing members FM are formed corresponding to the plurality of convex portions 120p. The backlight device according to an exemplary embodiment includes the plurality of fixing members FM at a plurality of positions, and thus may stably fix the light guide plate 120.

Figure 13:
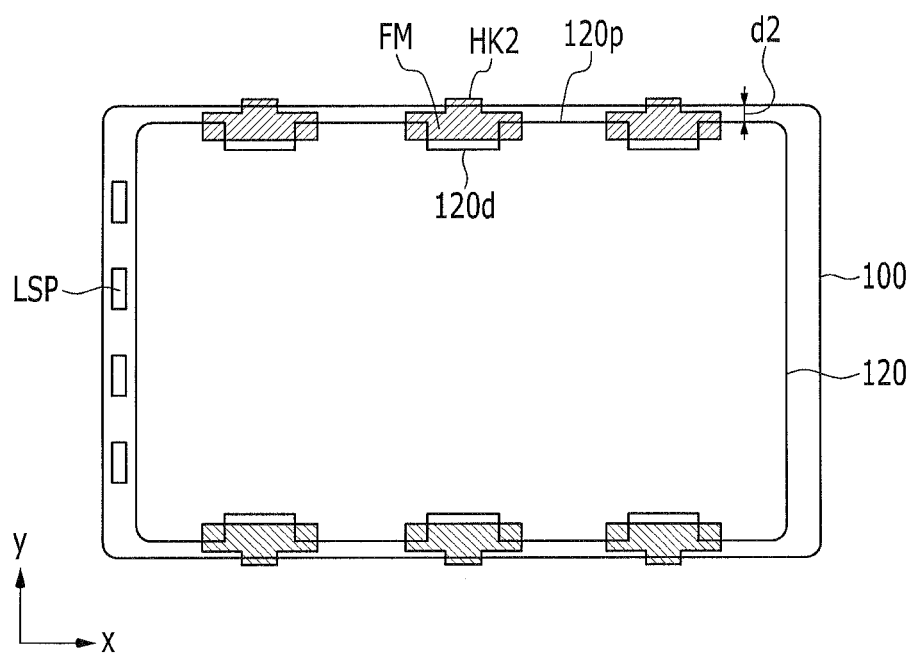
FIG. 13 is a top plan view illustrating a backlight device according to an embodiment of the present invention.

FIG. 13 is a top plan view illustrating a backlight device according to an embodiment of the present invention.

Referring to FIG. 13, the backlight device is the same or substantially the same as the backlight device described with reference to FIG. 8, except that a plurality of recess portions 120d are formed at one or more of four sides of the light guide plate 120, and a plurality of fixing members FM are formed corresponding to the plurality of recess portions 120d. The backlight device according to an exemplary embodiment includes the plurality of fixing members FM at a plurality of positions, and thus may stably fix the light guide plate 120.

While the embodiments of this invention have been described, it is to be understood that the invention is not limited to the disclosed embodiments, but, on the contrary, is intended to cover various modifications and equivalent arrangements included within the spirit and scope of the appended claims.

What is claimed is:
1. A backlight device comprising:
   a light guide plate including a convex portion and a recess portion;
   a lower cover comprising a lateral surface cover part, wherein the lateral surface cover part is positioned at a part corresponding to the convex portion, and wherein the lower cover receives the light guide plate;
a reflective sheet disposed between the light guide plate and the lower cover, wherein the reflective sheet includes a protruding portion disposed on the convex portion of the light guide plate;
and
a fixing member positioned between the light guide plate and the lateral surface cover part of the lower cover,
wherein the lateral surface cover part includes an opening,
wherein the fixing member comprises a first hook and a second hook,
wherein the first hook is substantially parallel to an XZ plane, and the second hook protrudes in a Y-axis direction with respect to the XZ plane,
wherein the opening of the lateral surface cover part is substantially parallel to the XZ plane,
wherein the first hook partially surrounds the convex portion of the light guide plate and the protruding portion of the reflective sheet, and
wherein the second hook protrudes through the opening of the lateral surface cover part.

2. The backlight device of claim 1, wherein the first hook comprises two hooks, and
the two hooks are latched to an upper surface of the convex portion.

3. The backlight device of claim 2, wherein the two hooks cover two lateral surfaces of the convex portion and a part connected from each of the two lateral surfaces to the upper surface of the convex portion.

4. The backlight device of claim 3, wherein the light guide plate has a horizontal cross-section shaped substantially polygonal including a plurality of sides, and wherein the fixing member is positioned at a first side of the horizontal cross-section of the light guide plate.

5. The backlight device of claim 4, further comprising a light source unit positioned at a second side of the horizontal cross-section of the light guide plate, wherein the second side is different from the first side.

6. The backlight device of claim 5, wherein the first side is longer than the second side.

7. The backlight device of claim 3, wherein the reflective sheet includes a recess portion respectively corresponding to the recess portion of the light guide plate.

8. The backlight device of claim 3, wherein a plurality of fixing members are disposed along one side of the light guide plate.

9. The backlight device of claim 2, wherein the convex portion of the light guide plate includes a first convex portion and a second convex portion, wherein the recess portion is disposed between the first and second convex portions, wherein
the two hooks cover one lateral surface of the first convex portion and a part connected from the one lateral surface of the first convex portion to an upper surface of the first convex portion, and one lateral surface of the second convex portion and a part connected from the one lateral surface of the second convex portion to an upper surface of the second convex portion, and wherein
the one lateral surface of the first convex portion and the one lateral surface of the second convex portion face each other with respect to the recess portion.

10. The backlight device of claim 9, wherein the light guide plate has a horizontal cross-section shaped substantially polygonal including a plurality of sides, and wherein the fixing member is positioned at a first side of the horizontal cross-section of the light guide plate.

11. The backlight device of claim 10, further comprising a light source unit positioned at a second side of the horizontal cross-section of the light guide plate, wherein the second side is different from the first side.

12. The backlight device of claim 11, wherein the first side is longer than the second side.

13. The backlight device of claim 9, wherein the reflective sheet includes a convex portion and a recess portion respectively corresponding to the convex portion and the recess portion of the light guide plate.

14. The backlight device of claim 9, wherein a plurality of fixing members are formed along one side of the light guide plate.

15. The backlight device of claim 1, wherein the fixing member is a light blocking member.

16. A display device, comprising:
a display panel; and
a backlight device configured to supply light to the display panel,
wherein the backlight device comprises
a light guide plate including a convex portion and a recess portion,
a lower cover comprising a lateral surface cover part, wherein the lateral surface cover part is positioned adjacent to the convex portion, the lower cover surrounding the light guide plate, and wherein the lateral surface cover part comprises a trench dimensioned and positioned to receive a fixing member between the lower cover and an outer wall of the lateral surface cover part,
a reflective sheet disposed between the light guide plate and the lower cover, wherein the reflective sheet includes a protruding portion disposed on the convex portion of the light guide plate, and wherein the convex portion of the light guide plate protrudes further from the light guide plate than the protruding portion of the reflective sheet protrudes from the reflective sheet, and
the fixing member positioned in the trench between the light guide plate and the lateral surface cover part of the lower cover, wherein
the lateral surface cover part includes an opening,
wherein the fixing member comprises a first hook and a second hook, the first hook partially surrounding the convex portion of the light guide plate and the protruding portion of the reflective sheet, and
the second hook protruding through the opening of the lateral surface cover part,
wherein the first hook is substantially parallel to an XZ plane, and the second hook protrudes in a Y-axis direction with respect to the XZ plane, and
wherein the opening of the lateral surface cover part is formed substantially parallel to the XZ plane.

17. The display device of claim 16, wherein the first hook covers two lateral surfaces of the convex portion and a part connected from each of the both lateral surfaces to the upper surface of the convex portion.

18. The display device of claim 17, wherein the light guide plate has a horizontal cross-section shaped substantially polygonal including a plurality of sides, and wherein the fixing member is positioned at a first side of the horizontal cross-section of the light guide plate.

19. The display device of claim 18, further comprising a light source unit positioned at a second side of the horizontal cross-section of the light guide plate, wherein the second side is different from the first side.

20. The display device of claim 19, wherein the first side is longer than the second side.

21. The display device of claim 17, wherein the reflective sheet includes a recess portion respectively corresponding to the recess portion of the light guide plate.

22. The display device of claim 17, wherein a plurality of fixing members are formed along one side of the light guide plate.

23. The display device of claim 16, wherein the convex portion of the light guide plate includes a first convex portion and a second convex portion, wherein the recess portion is disposed between the first and second convex portions, wherein
    the first hook covers one lateral surface of the first convex portion and a part connected from the one lateral surface of the first convex portion to an upper surface of the first convex portion, and one lateral surface of the second convex portion and a part connected from the one lateral surface of the second convex portion to an upper surface of the second convex portion, and wherein
    the one lateral surface of the first convex portion and the one lateral surface of the second convex portion face each other with respect to the recess portion.

24. The display device of claim 23, wherein the light guide plate has a horizontal cross-section shaped substantially polygonal including a plurality of sides, and wherein the fixing member is positioned at a first side of the horizontal cross-section of the light guide plate.

25. The display device of claim 24, further comprising a light source unit positioned at a second side of the horizontal cross-section of the light guide plate, wherein the second side is different from the first side.

26. The display device of claim 25, wherein the first side is longer than the second side.

27. The display device of claim 23, wherein the reflective sheet includes a convex portion and a recess portion respectively corresponding to the convex portion and the recess portion of the light guide plate.

28. The display device of claim 23, wherein a plurality of fixing members are formed along one side of the light guide plate.

29. The display device of claim 16, wherein the fixing member is a light blocking member.

* * * * *